United States Patent [19]
Huang

[11] Patent Number: 5,794,147
[45] Date of Patent: Aug. 11, 1998

[54] METHOD AND SYSTEM FOR QUICKLY FINDING A CONTROL CHANNEL IN A PRIVATE CELLULAR SYSTEM

[75] Inventor: Chenhong Huang, Plano, Tex.

[73] Assignee: Northern Telecom Limited, Montreal, Canada

[21] Appl. No.: 710,285

[22] Filed: Sep. 13, 1996

Related U.S. Application Data

[60] Provisional application No. 60/018,739, May 31, 1996.
[51] Int. Cl.⁶ .................................................. H04Q 7/00
[52] U.S. Cl. .................. 455/434; 455/454; 455/552; 455/67.1; 375/216
[58] Field of Search .............................. 455/403, 422, 455/434, 450, 452, 454, 455, 462, 464, 465, 515, 516, 517, 67.1, 553, 552, 161.1, 179.1, 188.1, 426; 375/216, 260, 343, 349, 207, 340, 341, 290

[56] References Cited

U.S. PATENT DOCUMENTS

| | | | |
|---|---|---|---|
| 5,199,031 | 3/1993 | Dahlin | 455/515 |
| 5,361,258 | 11/1994 | Arnold et al. | 455/67.1 |
| 5,655,003 | 8/1997 | Erving et al. | 455/434 |

*Primary Examiner*—Doris H. To
*Attorney, Agent, or Firm*—Christopher O. Edwards; John D. Crane

[57] ABSTRACT

The method of quickly locating non-standard control channels in private cellular systems is accomplished in an embodiment of the present invention by determining the modulation type of a particular channel. The mobile station scans a received RF channel. The received signal is used for the evaluation of the modulation type of that channel by using matched filters designed for the specific signal of interest, and/or in another embodiment of the present invention is used for producing the spectral energy distribution of the channel revealing the type of modulation.

14 Claims, 6 Drawing Sheets

METHOD AND SYSTEM FOR QUICKLY FINDING A CONTROL CHANNEL IN A PRIVATE CELLULAR SYSTEM

BACKGROUND OF THE INVENTION

1. Field of the Invention

The present invention relates generally to apparatus and method for communications and more specifically to mobile radio communications systems.

2. Description of the Related Art

Control channels are used in cellular systems to setup and control (hence the name) outgoing call origination from and incoming call reception by mobile stations. In traditional public cellular systems a minimum number of channels in the cellular spectrum is dedicated to and reserved for use as control channels. Private cellular systems that use portions of the overall public cellular system are prohibited from utilizing the public system's control channels as conflicts among public and private users may occur.

In public cellular systems such as Advanced Mobile Phone Service (AMPS), 21 dedicated control channels exist for each cell and are fixed in frequency systemwide. The remaining channels may be used for voice/data activity. When a mobile station scans the frequency spectrum in search of a control channel, at most 21 predefined frequencies need be scanned. This amount of scanning results in no appreciable delay in operations and is acceptable. However, this is not the situation with private cellular systems.

Private cellular systems operate within and use the public cellular system spectrum and are required by law to be transparent to other users of the public system. A typical private system uses a number of voice/data channels from the public cellular system. This number of public system voice/data channels includes both voice/data and control channels for the private system. As private control channels operate on public voice/data channels and are assigned to frequencies on a dynamic and somewhat arbitrary basis depending on current traffic needs and load of the underlying public systems, reserving a fixed control channel may not be practicable.

The cellular industry is venturing into new markets of micro-cellular applications such as wireless PBX and home residential wireless systems. This has been most evident by the recent release of the IS-94 standard, and subsequently, IS-91-A, designed for cellular microcell coverage and operations, and is especially suitable for private systems that support closed user group(s) and home residential systems in the 800 MHz public cellular systems. Since one of the mandatory requirements for private cellular systems is that public service not be impacted, non-public microcells must be totally transparent to terminals operating in the public cellular network. This requirement prohibits private microcells from using the standard control channels (i.e., the aforementioned 21 channels as specified in the AMPS/TDMA/CDMA standards). Consequently, private microsystems have to "steal" the unused cellular voice/traffic channels as their control channels. As such, the location of control channel for a private cell may be determined on a dynamic basis, depending on the actual call activities and frequency planning of the under-laying macro cell. The exact location of a control channel for a private system can be anywhere in the spectrum other than those reserved for the 21 control channels.

The somewhat arbitrary location of control channels of private systems places significant burden on the mobile stations to quickly lock onto the control channels to obtain service for the following reasons. First, the mobile terminals have to scan a significantly larger number of channels to find a control channel. For example, IS-94/IS-91-A specifies a channel block with a maximum of 128 channels for mobiles to scan for a control channel. Second, since this block of channels is actually the voice/traffic channel block of the under-laying macro cell, the mobile station must differentiate between control channels and voice/traffic channels. Third, because private systems only intend to provide services to closed user group(s), not every microcell will grant service to a particular mobile. Mobile stations may exhaust all existing micro control channels in places where multiple control channels exist due to overlapping microsystems to lock onto a system that grants their service.

One method for the purpose of finding non-standard control channels from a block of voice/traffic channels of the under-laying macrocell is based on achieving word-sync on each channel by the mobile station. In IS-94/IS-91-A, it is specified that the mobile station must determine whether word-sync can be achieved for each channel in the channel block.

A drawback of this scheme is that to determine if word-sync is achievable, the mobile station has to wait as long as 46.3 msec per scanned channel for the synchronization word for every channel in the block whose Radio Signal Strength reaches above a minimum threshold. Considering that there are as many as 128 channels in a block, this leads to unacceptable scanning delays of up to 5.93 seconds.

There is accordingly a need for a new method to expediting the search for control channels of private systems to reduce scanning time in order to solve or ameliorate one or more of the above-described problems.

SUMMARY OF THE INVENTION

The method of quickly locating non-standard control channels in private cellular systems is accomplished in an embodiment of the present invention by determining the modulation type of a particular channel. The mobile station scans a received RF channel. The received signal is used for the evaluation of the modulation type of that channel by using matched filters designed for the specific signal of interest, and/or in another embodiment of the present invention is used for producing the spectral energy distribution of the channel revealing the type of modulation.

In the first embodiment of the present invention, the selected channel is input to a matched filter bank, with each filter set to identify a particular modulation scheme. The modulation scheme is determined based on the maximized output of each of the filters of the matched filter bank.

In a second embodiment of the present invention, the spectral characteristics of the signals themselves are analyzed to determine the modulation scheme.

Typical modulation schemes in a cellular environment for 30 KHz channel communications include but are not limited to: FSK modulation for AMPS analog control channels (as per EIA/TIA-553) and TDMA (as per IS-54-B); FM modulation for analog voice channels (as per EIA/TIA-553); and DQPSK modulation for TDMA traffic channels and digital control channels (as per IS-54-B and IS-136). FSK, FM and DQPSK modulated channels may be identified by the method and system of the present invention to quickly find control channels by determining the modulation types of RF channels.

According to a preferred embodiment of the invention, a system and method of identifying and selecting a control channel from a plurality of voice/data channels within a cellular network including a base station and a mobile unit is provided with the steps of accepting an input signal from one of the channels, comparing the input signal to a predetermined baseline signal by passing the signal to a plurality of matched filters, each filter optimized to identify a modulation type of the input signal as one of the group of FM, FSK and QPSK modulation types, identifying the input signal as a control channel based on the modulation type, selecting a channel identified as containing a control signal for initiating and controlling communication with a base station and storing the channel number in memory.

It further includes a mobile unit for use in a wireless telephone system comprising means for receiving an input signal, means for comparing said input signal to a predetermined baseline signal, means for generating a comparison result based on the comparison of the baseline and input signal, means for identifying the input signal as a control channel based on a predetermined characteristic of the comparison result, and means for selecting the identified control channel identified for initiating and controlling communication with a base station.

Further features of the above-described invention will become apparent from the detailed description hereinafter.

The foregoing features together with certain other features described hereinafter enable the overall system to have properties differing not just by a matter of degree from any related art, but offering an order of magnitude more efficient use of processing time and resources.

Additional features and advantages of the invention will be set forth in part in the description which follows, and in part will be apparent from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate preferred embodiments of the apparatus and method according to the invention and, together with the description, serve to explain the principles of the invention.

DETAILED DESCRIPTION

Figure 1:
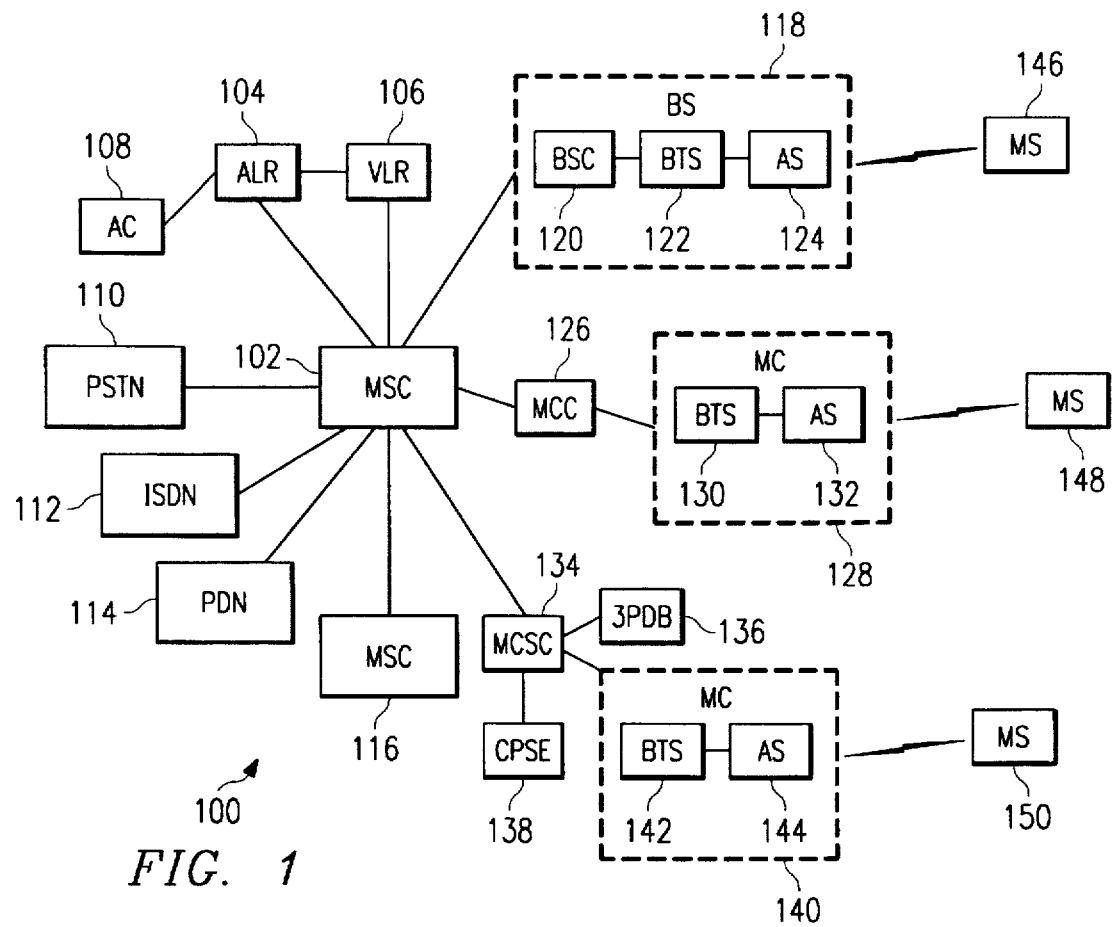
FIG. 1 illustrates a typical cellular network of the present invention.

Referring now to FIG. 1, cellular system 100 includes many typical components including mobile switching centers (MSCs) 102, 116 operably connected together with MSC 102 connected via landline to public switched telephone network (PSTN) 110. MSC 102 may also be directly coupled to an Integrated Services Digital Network (ISDN) 112 and/or Packet Data Network (PDN) 114. Other MSCs (not shown) may be connected to each other and to PSTN 110 at various points (also not shown) according to desired design parameters.

MSC 102 is typically connected to a number of Base Stations (BSs) 118 which serve to connect Mobile Stations (MSs) 146,148,150 to the cellular network 100. BS 118 includes Base Station Controller (BSC) 120, Base Transceiver Station (BTS) 122 and Antenna System (AS) 124. Also attached to each MSC 102 is a Home Location Register (HLR) 104, Authorization Controller (AC) 108 and Visiting Location Register (VLR) 106. These devices provide for mobility management of the mobile stations and for preventing cellular fraud.

Also connected to MSC 102 is microcell controller (MCC) 126 and microcellular system controller (MCSC) 134. Microcontroller (MC) 128, 140 includes a base transceiver system 130, 142 with associated antenna systems 132, 144, all respectively.

MSCS 134 is connected to Customer Premises Supplied Equipment (CPSE) 138, Third Party Database (3PDB) 136 and microcontroller 140. These systems combined may include private cellular systems as discussed above.

Figure 2:
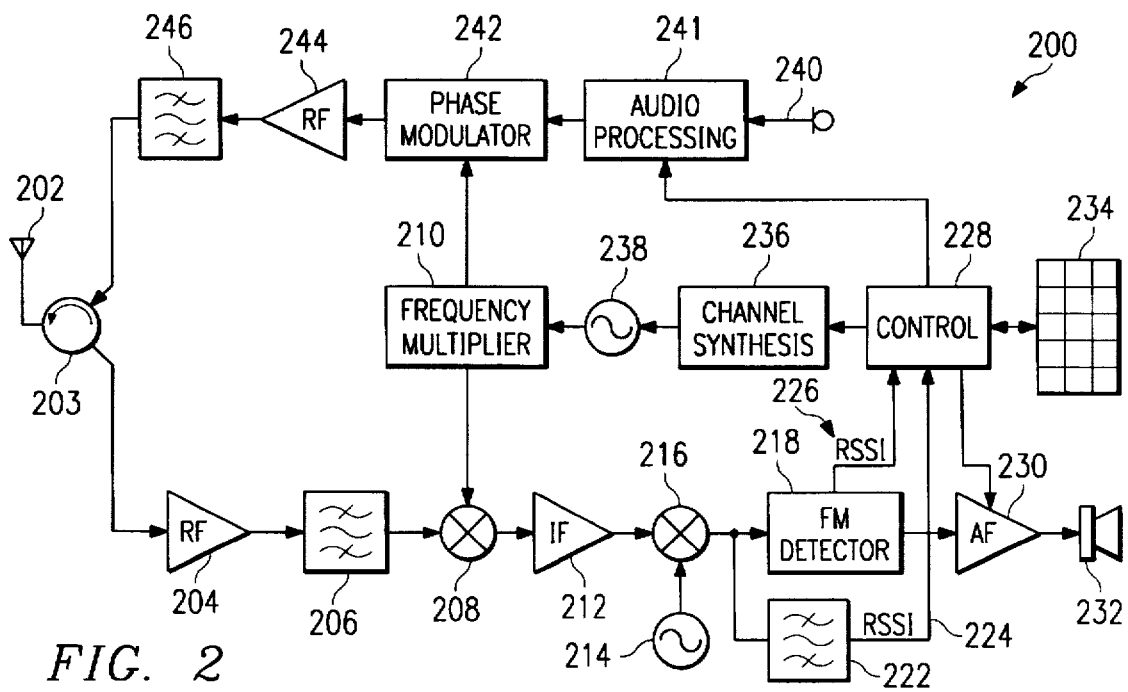
FIG. 2 illustrates a block diagram of a mobile station configured for fast scanning.

FIG. 2 is a block diagram of a mobile station 200 of the current invention. Mobile station 200 includes transmit/receive portions that use a circulator 203 to access a diplexed antenna 202 for both transmit and receive functions. Receive RF amplifier 204 accepts a received signal from antenna 202, amplifies the signal and passes it along to bandpass filter 206 where out of band signal components are eliminated. The signal is downconverted to an intermediate frequency (IF) when passed through mixer 208 and combined with the mixing signal from frequency multiplier 210. The received signal passes through an IF filter where it is down converted a second time to a baseband signal through a second mixer with input from fixed local oscillator 214.

Frequency multiplier 210 supplies a variably programmable mixing signal through combination of table lookup 234, control module 228 and channel synthesis module 236.

The received baseband signal is simultaneously sent to an FM/FSK/PSK detector to process the signal when it is a received voice signal (FM or FSK for analog and QPSK for digital) and along to processor 222 when a control channel is required to be identified. Processor 222 identifies the channel as a control channel by identifying the modulation scheme and/or spectrum characteristics and passes that information to control 228. Processor 222 may be one of a many different types including matched filters or spectrum analyzers.

The transmission portion of the block diagram is fairly conventional and includes voice input to microphone 240, input audio processing 241, phase modulation in phase modulator 242, RF amplification in RF module 244 and bandpass filtering in filter 246 before passing through circulator/diplexer 203 on the way to antenna 202.

In order to explain the proposed invention, the fundamentals of the three types of modulation of the preferred embodiments will now be discussed. Binary continuous phase frequency shift keying (BCFSK) is used for analog control channel modulations. The BCFSK waveforms for a constant complex envelop of duration T and amplitude A are simply written as $$S_i(t) = A\cos\left(2\pi f_c t + 2\pi f_d T \sum_k I_k q(t - kT)\right);$$

where $$q(t) = \begin{cases} 0 & t < 0 \\ t/T & 0 \leq t \leq T \\ 1 & t > T \end{cases}$$

with $2f_d$ being the separation between two adjacent frequencies, $f_c$ is the carrier frequency, $\{I_k\}$ is the binary information sequence and k is the index of that sequence. To apply the above equations to a typical AMPS/TDMA control channel as per either EIA/TIA-553 or IS-54B, the parameters can be specified as follows:

$2f_d$=16 KHz $1/T$=10 Kbits plus/minus 1 bit per second

Figure 3A:
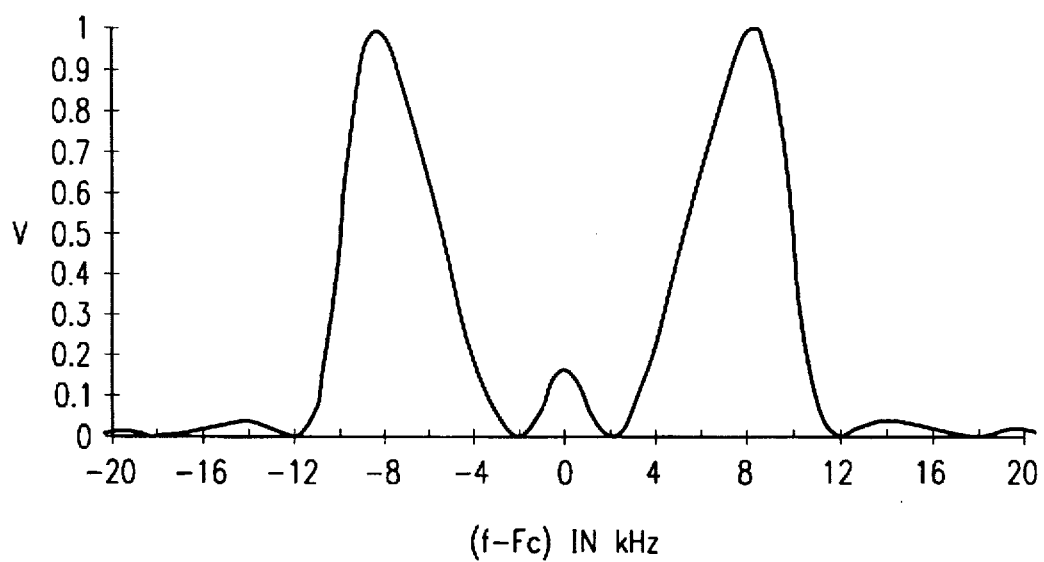
FIG. 3a illustrates the power density spectrum of an FSK signal with the amplitude in volts.
Figure 3B:
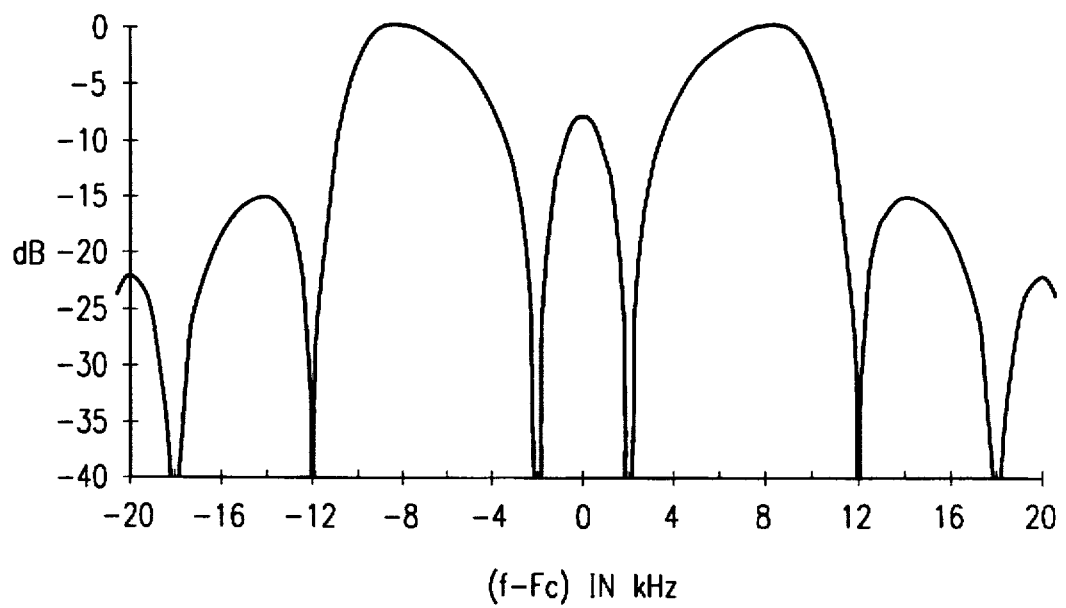
FIG. 3b illustrates the power density spectrum of an FSK signal with the amplitude in dB.

The spectrum density can then be formulated and calculated. A plot of the forms is shown in FIG. 3, where FIG. 3a) is the normalized spectral density expressed in volts, and FIG. 3b) is the spectral density in dB. An observation of the distribution indicates that a FSK modulated channel has two peaks near 8 KHz above and below the carrier frequency, which correlates with the value of $f_d$ in the above equations. Indeed, in analog control channels, a peak of 8 KHz above the carrier represents a binary '1', and a peak of 8 KHz below the carrier means a binary '0'. As we will see below, this spectral density distribution is quite different from channels with different modulation schemes. For IS-54-B π/4 DQPSK modulation the information sequence is encoded into one of the four π/4 QPSK phases. The π/4 QPSK phases are then differentially coded and transmitted. The transmitted waveform in each symbol interval $T_s$ is therefore one of the eight possible signal waveforms. These waveforms are as follows:

$s_1(t)=A\delta(t)$ $s_2(t)=Aj\delta(t)$ $s_3(t)=-Aj\delta(t)$ $s_4(t)=-A\delta(t)$ $s_5(t)=0.707A(\delta(t)+j\delta(t)$ $s_6(t)=0.707A(\delta(t)-j\delta(t)$ $s_7(t)=-0.707A(\delta(t)+j\delta(t)$ $s_8(t)=-0.707A(\delta(t)-j\delta(t)$ where δ(t) denotes the impulse function and j corresponds to the complex square root of −1. These waveforms are then filtered by a Square root raised cosine filter (whose characteristic is described in IS-54-B) and are used to amplitude modulate the carrier. It must be noted that the waveform transmitted during any symbol period corresponds to either the set $\{s_1(t),s_2(t),s_3(t),s_4(t)\}$ or $\{s_5(t),s_6(t)s_7(t),s_8(t)\}$.

An objective in DQPSK signaling is to maintain a constant waveform envelope with the information conveyed by phase. As the waveforms are differentially encoded, waveforms transmitted in consecutive symbol intervals are correlated.

Figure 4A:
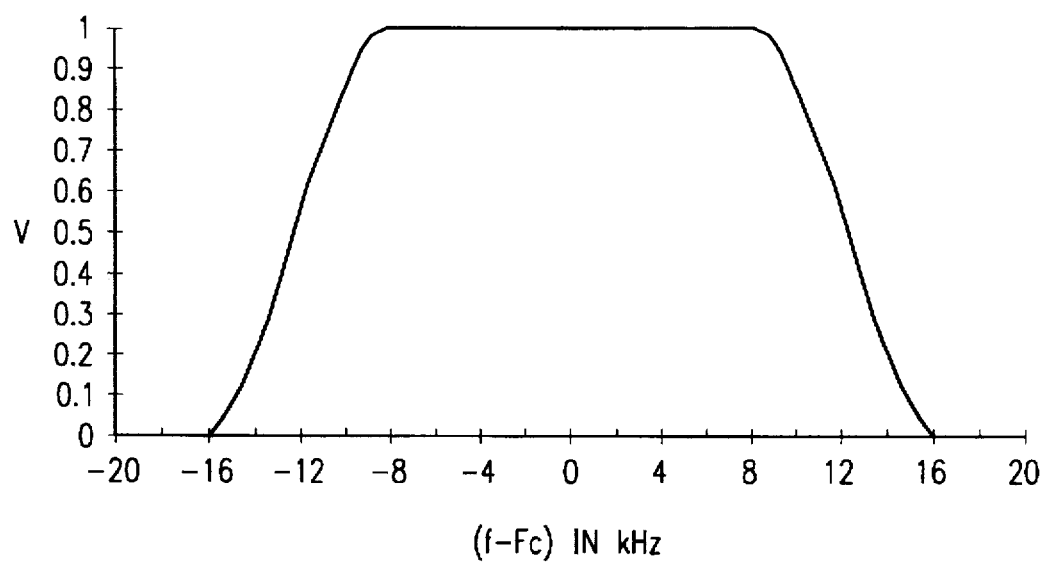
FIG. 4a illustrates the power density spectrum of a π/4 DQPSK signal with the amplitude in volts.
Figure 4B:
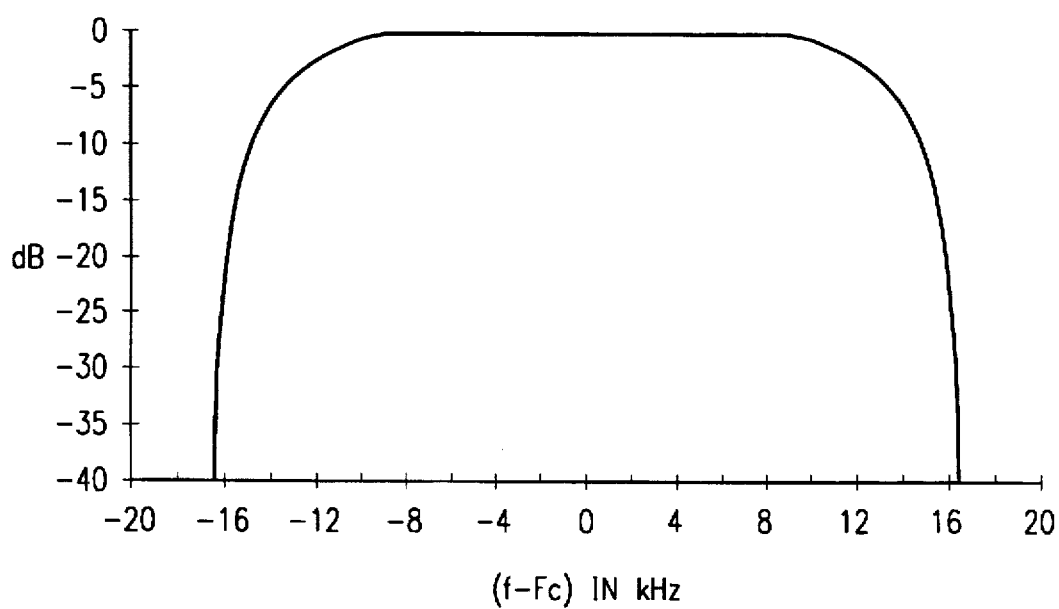
FIG. 4b illustrates the power density spectrum of a π/4 DQPSK signal with the amplitude in dB.

In FIG. 4 we present a typical power spectrum for the π/4 DQPSK modulated channel per IS-54-B. FIG. 4a shows the normalized spectrum density in volts, while FIG. 4b is the distribution in dB. It is interesting to see that due to the square root raised cosine filter, the spectrum is very flat in the entire channel spacing, which makes it quite distinguishable from that of the FSK modulated spectrum density profile of FIG. 3.

A frequency-modulated signal can be written as $$s(t) = A_c \cos\left[2\pi f_c t + 2\pi k_f \int_{-\infty}^{t} m(\tau)d\tau\right]$$

where $k_f$ is the frequency deviation constant expressed in Hertz per Volt, m(t) is the baseband message signal (which in this case is voice), $f_c$ is the carrier frequency and $A_c$ the amplitude of the carrier. Frequency modulation can spread the energy across an entire bandwidth. Since the frequency modulation is a non-linear process, an exact description for a general case with multiple voice frequencies is difficult to obtain. Also since voice is a non-stationary stochastic process, it is not possible to compute the exact spectral density. The simplifying assumption is made that the voice signal in the FM modulator, after pre-emphasis and the post deviation filter, is a Gaussian wide sense stationary process, and the spectral density of voice can be approximated to be a low pass process of the first order. i.e. it is of the form $$S(f) = \frac{K}{1 + (f/f_o)^2}$$

where K is a constant and $f_o$ is the 3 dB point of the low pass process.

The auto correlation of the frequency modulated signal is then given by:

$$\phi(\tau) = e^{-k(\tau)}$$

$$k(\tau) = \frac{\phi_{fd}(0)}{f_o^2} [\exp(-2\pi f_o|\tau|) + 2\pi f_o|\tau| - 1]$$

where $\phi_{fd}(0)$ is the mean squared value of the frequency deviation.

Figure 5A:
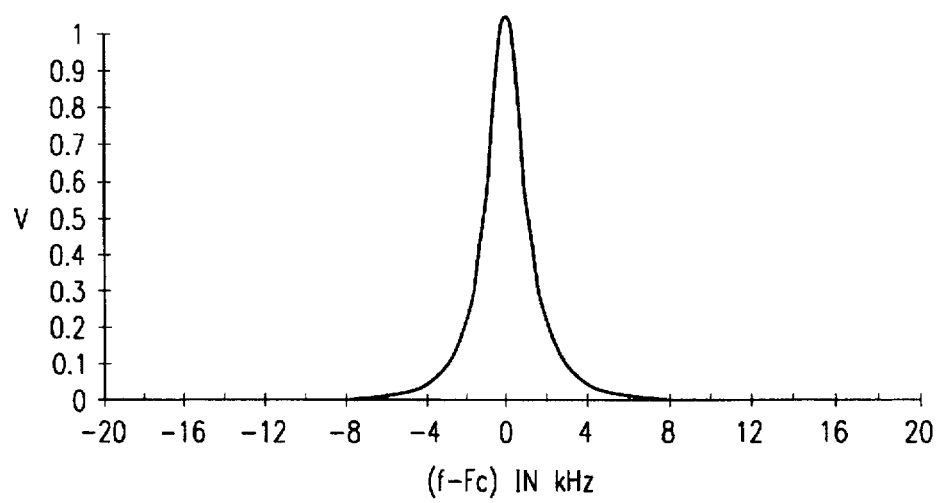
FIG. 5a illustrates the power density spectrum of an FM signal with the amplitude in volts.
Figure 5B:
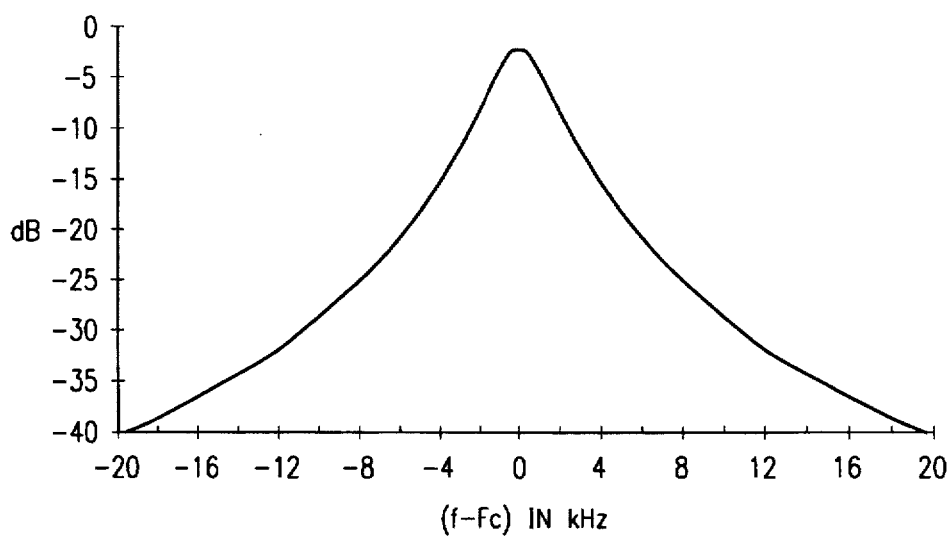
FIG. 5b illustrates the power density spectrum of an FM signal with the amplitude in dB.

From EIA/TIA-553 or IS-54B, we can obtain the following values $f_o$=3.5 kHz and $\phi_{fd}(0)$=4.205 (kHz)$^2$ The spectral density has been obtained by taking an FFT of the above expression, and is presented in FIGS. 5a and 5b. It is quite clear in this case that power is distributed across a relatively narrow bandwidth due to small frequency deviation, and is quite distinguishable from the modulation schemes discussed above.

With the above analysis of the three different types of modulated channels, numerically comparing the spectrum density distributions may be accomplished. In fact, there are many ways to numerically differentiate FM-modulated and π/4 DQPSK-modulated channels from the FSK-modulated channels.

One embodiment is to use a notch filter which only passes energy in the middle of a baseband signal. By appropriate design, the output of an FSK signal through this filter is distinguishable from the outputs of either a QPSK or FM channel.

$$|H(f)|^2 = \frac{f_o \pi/2}{\left(1 + \frac{f^2}{f_o^2}\right)}$$

Phase Shift Keying

The magnitude response of the matched DQPSK filter 610 is given by $$|H(f)|^2 = \begin{cases} \frac{1}{T}\left(1 - \frac{\alpha}{4}\right) & 0 \leq f \leq \frac{1-\alpha}{2T} \\ \frac{1}{2T}\left(1 - \frac{\alpha}{4}\right)\left(1 - \sin\left(\frac{\pi(2fT-1)}{2\alpha}\right)\right) & \frac{1-\alpha}{2T} \leq f \leq \frac{1+\alpha}{2T} \\ 0 & f > \frac{1+\alpha}{2T} \end{cases}$$

Another embodiment is to exploit the symmetric nature of the baseband signals by implementing a filter that operates on one side of the signal. Such a filter achieves the purpose of distinguishing the channel waveforms.

Two other embodiments of the invention will now be explained with more detail.

Figure 6:
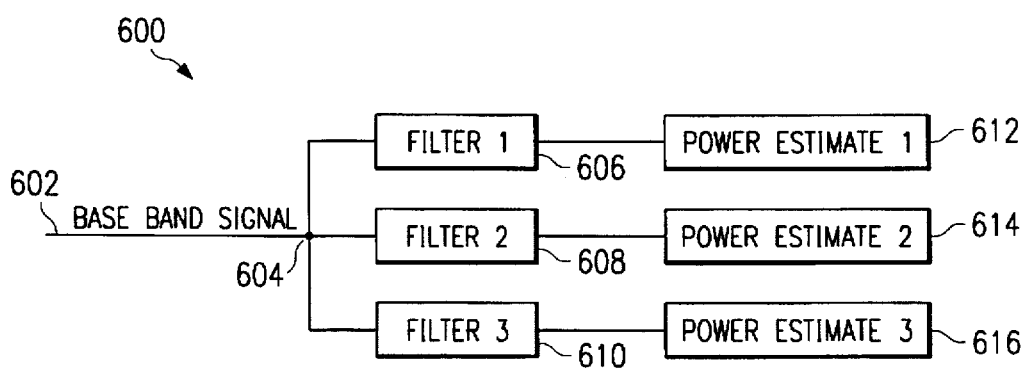
FIG. 6 illustrates a matched filter bank of the present invention.

A first embodiment of the invention utilizes matched filters as shown in FIG. 6. Matched filter bank 600 corresponds to processor 222 of FIG. 2. A baseband signal 602 is divided at splitter 604 and input to each of 3 matched filters, filter-1 606, filter-2 608 and filter-3 610 corresponding to BCFSK, FM and DQPSK modulation respectively.

Frequency Shift Keying

The magnitude response of the Matched BCFSK 606 filter is given by $$|H_1(f)|^2 = K\left[\frac{1}{2}\sum_{i=1}^{2} A_i^2(f) + \frac{1}{2}\sum_{i=1}^{2}\sum_{j=1}^{2} A_i(f)A_j(f)B_{ij}(f)\right]$$

and $$A_i(f) = \frac{\sin(\pi T(f - (2i-3)f_d))}{\pi T(f - (2i-3)f_d)}$$

$$B_{ij}(f) = \frac{\cos(2\pi fT - \alpha_{ij}) - \phi\cos(\alpha_{ij})}{1 + \phi^2 - 2\phi\cos(2\pi fT)}$$

$$\alpha_{ij} = 2\pi f_d T(i + j - 3)$$

$$\phi = \frac{\sin(4\pi f_d T)}{2\sin(2\pi f_d T)}$$

with $f_d$ being the frequency deviation, T=0.1 ms, and K is a normalization constant.

Frequency Modulation

Although the spectra of the FM signal is calculated with the assumption that the modulating signal is Gaussian distributed, the exact spectral density of FM varies as the voice is not a stationary process. However, the FM modulated signal is a narrowband signal due to the relatively small value of the frequency deviation. For the matched filter a low pass spectra with 3 dB point at $f_o$=3.5 kHz is assumed. The magnitude response of the matched FM filter 608 is given by where α=0.35 and T=0.4115 msec.
Note:
1) The filters are normalized such that $$\int_{-\infty}^{\infty} |H(f)|^2 df = 1$$

2) The window size for the power estimate is sufficiently large so that the random quantities are taken on averaged values.

Figure 7:
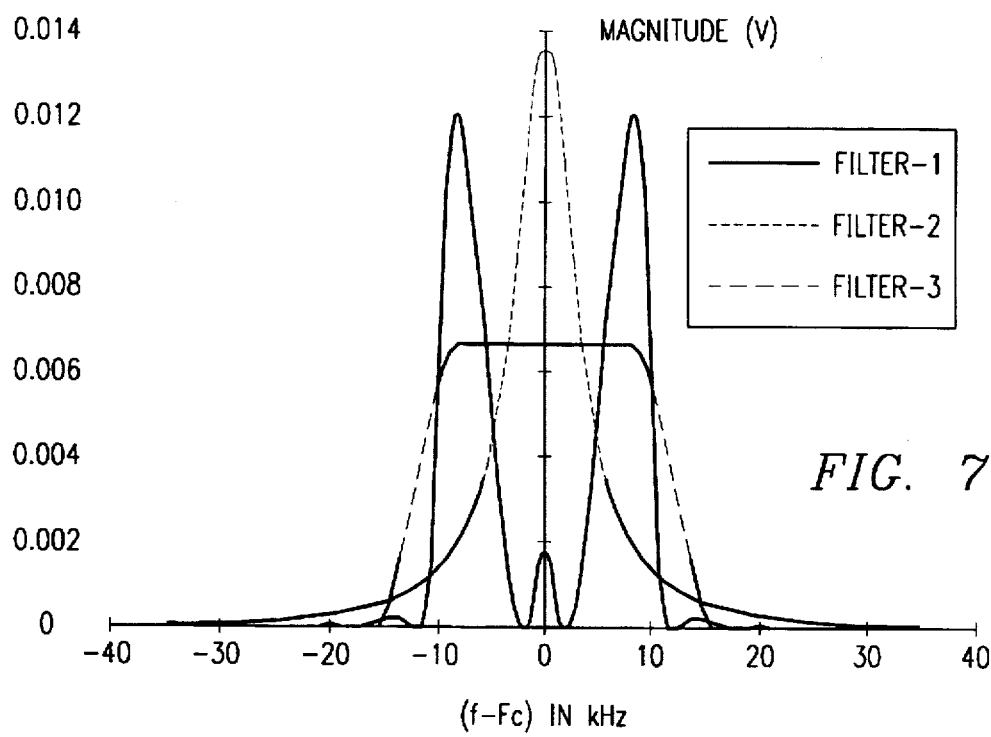
FIG. 7 illustrates a magnitude response of the matched filter bank of the present invention.

The magnitude responses of the three filters 606, 608, 610 discussed above are plotted in an overlay fashion in FIG. 7. The calculated value of the normalized power estimates for the three modulation schemes at the output of each of filters 606, 608, 610 as found in Power Estimate-1 612, Power Estimate-2 614 and Power Estimate-3 616 is given in Table 1 below.

TABLE 1

Expected values of the ratio of Power Estimates at the output of the three filters.

| Modulation type | Power Estimate 1 | Power Estimate 2 | Power Estimate 3 |
|---|---|---|---|
| BCFSK | 1.0 | 0.3531 | 0.7591 |
| F.M. | 0.1115 | 1.0 | 0.5743 |
| DQPSK | 0.7595 | 0.8145 | 1.0 |

From this table, it is apparent that whenever the transmitted modulation scheme is BFSK, the power estimate at the output of Filter-1 606 is maximized and if any other form of modulation is used then the power estimate at either the output of Filter-2 608 or Filter-3 610 will be maximized. Likewise, Power Estimate-2 is maximized for FM and Power Estimate-3 is maximized for DQPSK. The flow chart for this method is found in FIG. 8.

Figure 8:
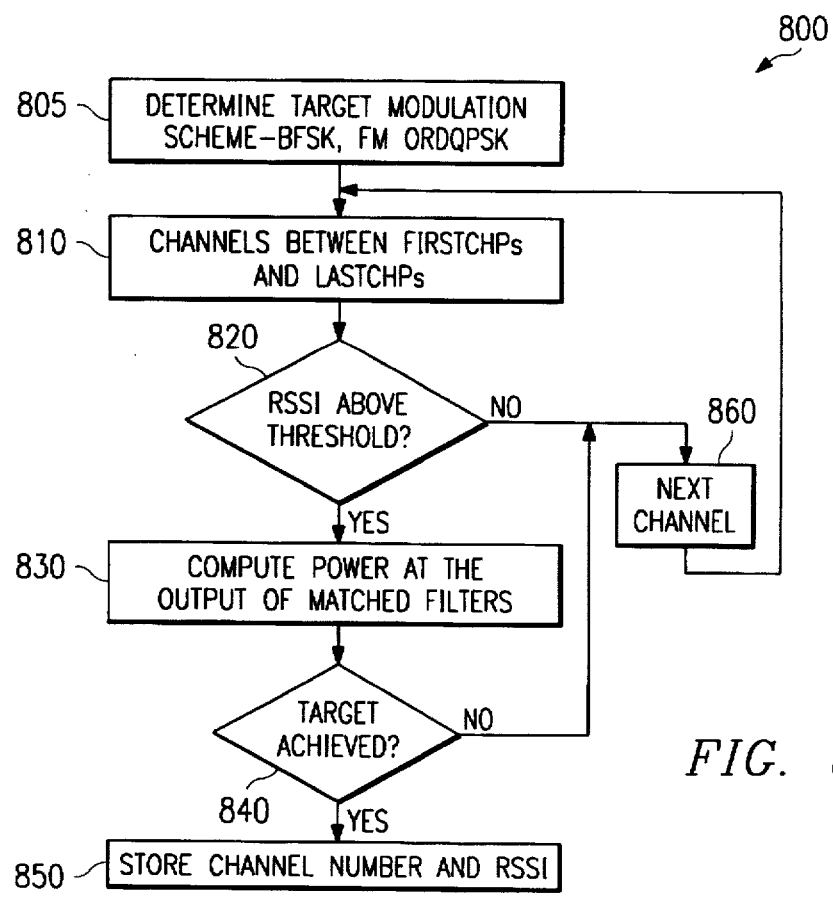
FIG. 8 illustrates a flowchart for the method of determining a control channel by using matched filters.

Method 800 in FIG. 8 determines the maximized output from matched filters tuned to specific modulation types for BCFSK, FM and π/4 DQPSK.

In step 805 the desired modulation scheme is determined. As an example, AMPS uses FSK on an analog control channel as detailed above. FM or π/4 DQPSK may also be a desired modulation scheme in this embodiment. Step 810 involves repeatedly stepping through signals on all channels that are in the range between FIRSTCHPs and LASTCHPs.

where FIRSTCHPs and LASTCHPs are the beginning and ending frequencies of interest, respectively. In step 820 the received signal is passed through a signal strength indicator. A channel with a received signal strength below a certain predetermined threshold is eliminated and the flow continues to the next channel for signal strength determination. Upon reception of a signal above the minimum received strength, the signal is passed to the matched filter bank for processing as in step 830. If the target modulation scheme is identified in step 840, then control is passed to step 850 where the identified control channel number and received signal strength is stored. If the target modulation is not identified, then control passes to block 860 where the process begins again at the next channel.

Figure 9:
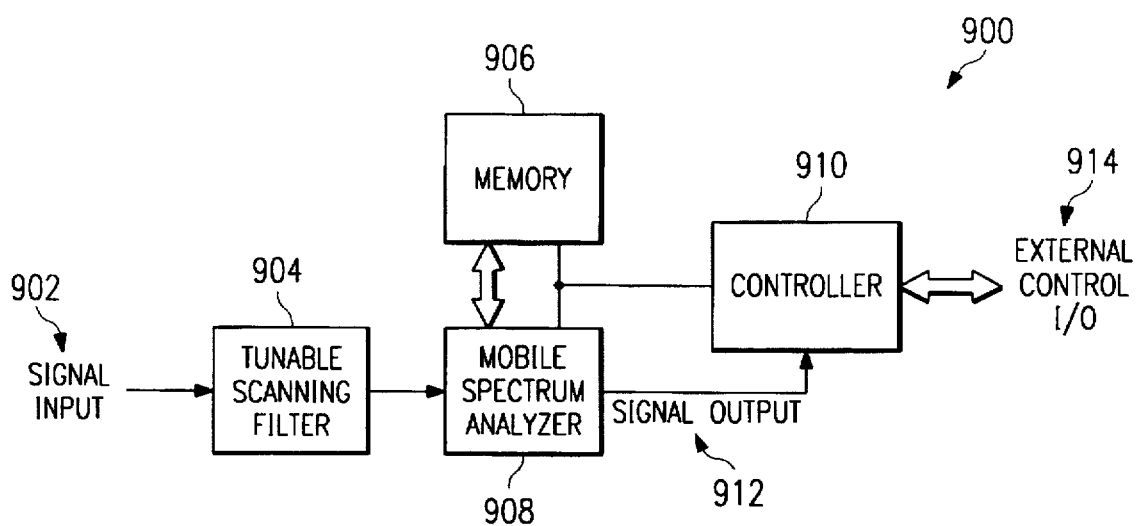
FIG. 9 illustrates a spectral estimation device of the present invention.

Referring now to FIG. 9, spectrum analysis processor 900 includes a tunable scanning filter 904 for receiving a signal input 902 from an external source (not shown) which may be the antenna 202 from FIG. 2. Tunable scanning filter 904 selects a frequency of interest (the current channel) and delivers it to mobile spectrum analyzer 908 where an FFT is performed on the signal in the channel to convert the representation to the frequency domain where it is compared to the target signals previously stored in memory 906. Controller 910 performs all housekeeping and overhead functions and receives an output signal 912 from spectrum analyzer 908 indicating whether a control channel has been identified for transfer to the system.

Figure 10:
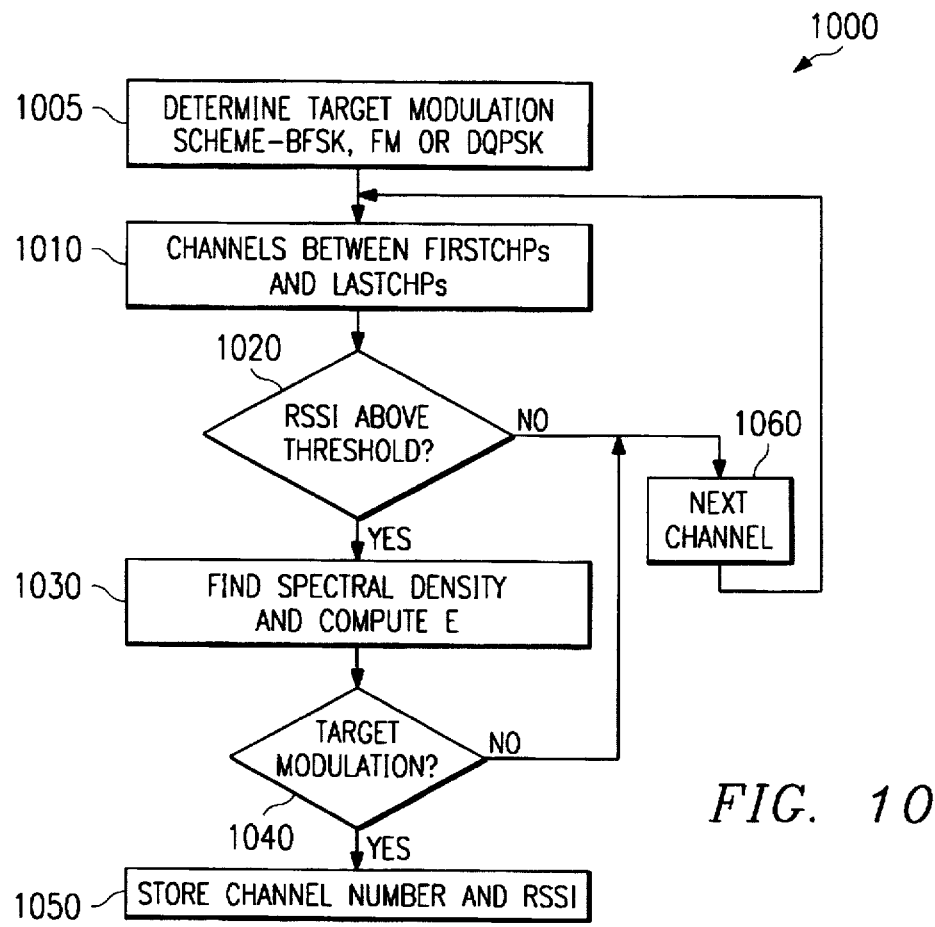
FIG. 10 illustrates a flowchart for the method of determining a control channel by using spectral estimation.

Method 1000 in FIG. 10 determines the maximized output from the spectrum analysis processor 900 with comparison with stored frequency domain representations of specific modulation types for BCFSK, FM and π/4 DQPSK.

In step 1005 the desired modulation scheme is determined. As an example, AMPS uses FSK on an analog control channel as detailed above. FM or π/4 DQPSK may also be a desired modulation scheme in this embodiment. Step 1010 involves repeatedly stepping through signals on all channels that are in the range between FIRSTCHs and LASTCHPs, where FIRSTCHPs and LASTCHPs are the beginning and ending frequencies of interest, respectively. In step 1020 the received signal is passed through a signal strength indicator. A channel with a received signal strength below a certain predetermined threshold is eliminated and the flow continues to the next channel for signal strength determination. Upon reception of a signal above the minimum received strength, the signal is passed to the spectrum analysis processor for processing as in step 1030. If the target modulation scheme is identified in step 1040, then control is passed to step 1050 where the identified control channel number and received signal strength is stored. If the target modulation is not identified, then control passes to block 1060 where the process begins again at the next channel.

Other such embodiments of the invention will be apparent to those skilled in the art from consideration of the specification and practice of the invention disclosed herein. It is readily apparent that the above described invention may be implemented in any type of radiotelephone system including a cellular or microcellular, public or private system that involves any method that uses differentiation of modulation types of a RF channel to identify a control channel. It is intended that the specification and examples be considered as exemplary only, with a true scope and spirit of the invention being indicated by the following claims.

What is claimed is:

1. In a radio communication system utilizing a plurality of channels, a method for identifying one of the channels as a control channel including the steps of:

accepting an input signal from one of said channels;

comparing said input signal to a predetermined baseline signal by passing said input signal through a spectrum analyzer configured to identify a predetermined characteristic of the input signal;

identifying the input signal as a control channel based on a predetermined characteristic of the comparison result; wherein the radio communication system is a mobile radiotelephone system and the plurality of channels is divided into a plurality of voice/data channels and a plurality of control channels.

2. The method of claim 1 wherein the step of comparing further includes the step of comparing the signal to a plurality of predetermined signals.

3. The method of claim 2 wherein the predetermined signal has characteristics identifiable as one of the group of FM, QPSK and FSK modulation types.

4. The method of claim 3 further including the step of:

storing the channel number so identified.

5. The method of claim 1 wherein the comparing steps include:

spectrally analyzing the input signal;

determining spectral characteristics of the input signal;

comparing the spectral characteristics of the input signal with a predefined baseline signal; and generating a result based on said comparison.

6. The method of claim 5 further including the steps of:

identifying the input signal as a control signal; and selecting a channel identified as containing a control signal for initiating and controlling communication with a base station.

7. The method of claim 6 further including, prior to spectrally analyzing, the steps of:

normalizing the input signal; and converting the signal from the time domain to frequency domain in near real time.

8. A method of identifying and selecting a control channel from a plurality of voice/data channels within a cellular network including a base station and a mobile unit, the method comprising the steps of:

accepting an input signal from one of said channels;

comparing said input signal to a predetermined baseline signal by comparing characteristics of the signal to a plurality of previously stored characteristics, each of the stored characteristics indicative of a modulation type of the input signal;

identifying the input signal as a control channel based on said modulation type;

selecting a channel identified as containing a control signal for initiating and controlling communication with a base station; and storing the channel number in memory.

9. A mobile unit for use in a wireless telephone system comprising:

means for receiving an input signal;

means for comparing said input signal to a predetermined baseline signal;

means for generating a comparison result based on the comparison of the baseline and input signal, said means for generating further including means for determining spectral characteristics of the input signal;

means for identifying the input signal as a control channel based on a predetermined characteristic of the comparison result; and means for selecting the identified control channel identified for initiating and controlling communication with a base station.

10. A mobile unit as in claim 9 further comprising:

means for comparing the input signal spectral characteristics to predetermined characteristics of a baseline signal; and means for identifying the input signal as a control signal.

11. A mobile unit as in claim 10 further comprising:

means for selecting a channel identified as containing a control signal for initiating and controlling communication with a base station.

12. A mobile unit as in claim 11 further comprising:

means for converting the signal from the time domain to frequency domain in near real time.

13. A mobile unit as in claim 12 further comprising:

means for normalizing the input signal prior to spectrally analyzing.

14. A mobile unit as in claim 13 further comprising means for storing the channel number so identified.

* * * * *